US007819748B2

(12) United States Patent
Ajioka

(10) Patent No.: US 7,819,748 B2
(45) Date of Patent: Oct. 26, 2010

(54) GAME APPARATUS AND STORAGE MEDIUM STORING GAME PROGRAM

(75) Inventor: Yoshitaka Ajioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1035 days.

(21) Appl. No.: 11/227,605

(22) Filed: Sep. 16, 2005

(65) Prior Publication Data

US 2006/0089197 A1 Apr. 27, 2006

(30) Foreign Application Priority Data

Oct. 27, 2004 (JP) ............................. 2004-312977

(51) Int. Cl.
*A63F 13/00* (2006.01)
(52) U.S. Cl. .......................................... 463/37; 463/31
(58) Field of Classification Search .................. 463/31, 463/30, 32, 33, 34, 43, 44, 37
See application file for complete search history.

(56) References Cited

U.S. PATENT DOCUMENTS

| 6,320,988 | B1 | 11/2001 | Yamaguchi et al. |
| 6,515,687 | B1 | 2/2003 | Wynn et al. |
| 7,347,780 | B1 * | 3/2008 | Best .............................. 463/37 |
| 7,371,163 | B1 * | 5/2008 | Best .............................. 463/1 |
| 2005/0202869 | A1 | 9/2005 | Miyamoto et al. |

FOREIGN PATENT DOCUMENTS

| EP | 0 840 256 | 5/1998 |
| JP | 10-188028 | 7/1998 |
| JP | 11-224351 | 8/1999 |
| JP | 2002-292127 | 10/2002 |
| JP | 2002-319035 | 10/2002 |

OTHER PUBLICATIONS

Burton, "Sodaconstructor", Feb. 2, 2002, 2 pages, http://www.sodaplay.com/constructor/ & http://web.archive.org/web/20020202130748/http://sodaplay.com/constructor/.
Jakobsen, "Advanced Character Physics", Gamasutra, Jan. 21, 2003, pp. 1-16, http://www.gamasutra.com/resource_guide/20030121/jacobson_pfv.htm.
Coleman et al., "Mezase Puroanimeta Maya Kyarakuta Animeshon (Maya Character Animation—For Aspiring Professional Animators)", 1$^{st}$ Ed., Kabushiki Kaisha Digital, Apr. 25, 2005, pp. 125-133, with a partial translation.

(Continued)

*Primary Examiner*—James S McClellan
(74) *Attorney, Agent, or Firm*—Nixon & Vanderhye P.C.

(57) ABSTRACT

A display section 12 covered with a touch panel 13 displays a character image C on a display screen. Structure data of a character in which a plurality of bones B are joined together with joints J, and polygon data Po for each portion of the character C corresponding to each bone B, are stored. The character image is displayed on the display screen based on the structure data, the polygon data Po, and a position of the character C. Position data corresponding to touch operation input data is calculated, and an angle of a joint J of the character C corresponding to the position data is changed. Thereafter, the character C is drawn and displayed on the display screen while changing a portion whose joint angle is changed, in real time, in accordance with the angle.

14 Claims, 13 Drawing Sheets

OTHER PUBLICATIONS

"Nintendogs", Weekly Famitsu, Enterbrain, Inc., vol. 19, No. 44, pp. 118 and 119, with a partial English translation, 4 pages, Oct. 15, 2004.

"Nintendogs", Dengeki GameCube, MediaWorks, Inc., vol. 4, No. 16, p. 23, with a partial English translation, 3 pages, Oct. 26, 2004.

* cited by examiner

F I G. 8
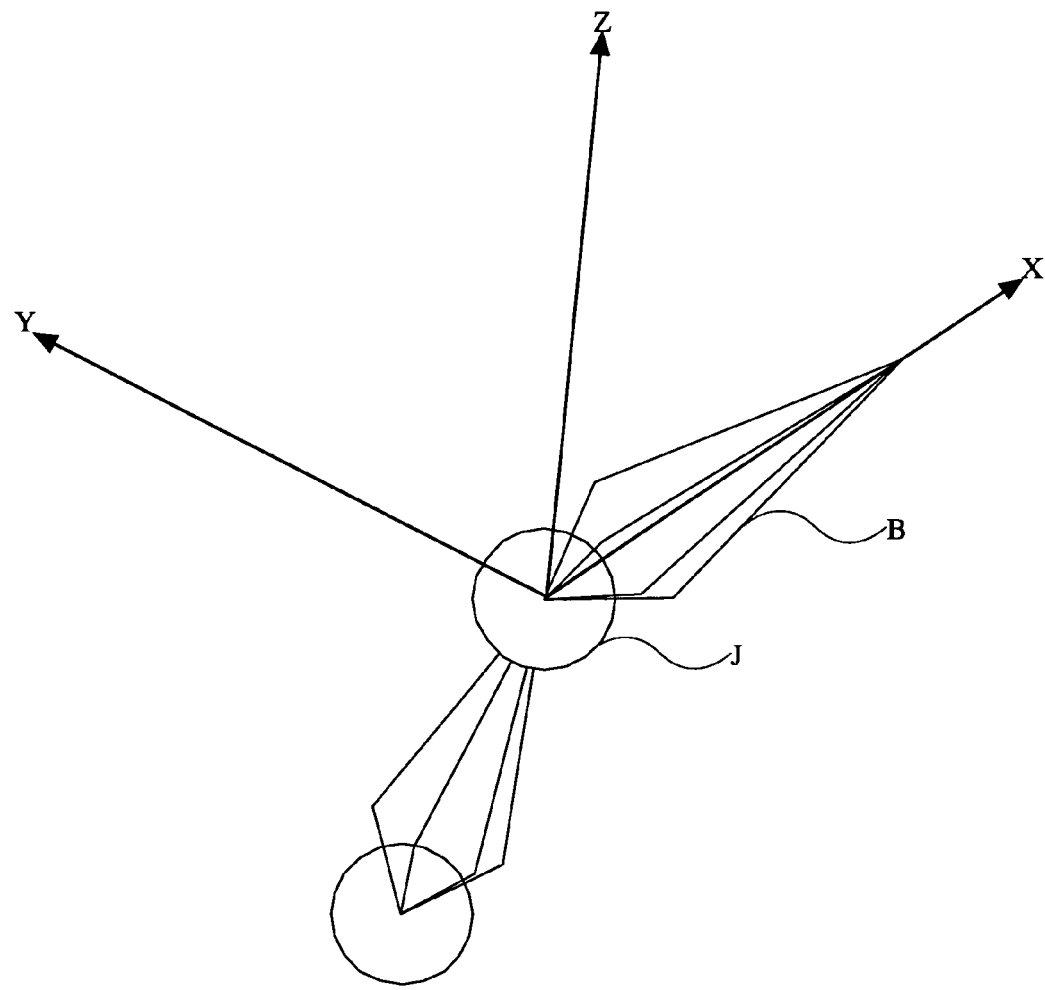

US 7,819,748 B2

GAME APPARATUS AND STORAGE MEDIUM STORING GAME PROGRAM

BACKGROUND

1. Field of the Technology

The technology presented herein relates to a game apparatus and a storage medium storing a game program. More particularly, the technology relates to a game apparatus and a storage medium storing a game program, the game apparatus and the game program performing a game in which a game play proceeds, depending on a touch operation with respect to a character displayed on a display screen, and the touch operation being performed on a touch panel which covers the display screen.

2. Description of the Background Art

Conventionally, there are a number of games in which characters or the like are three-dimensionally represented using polygons in a virtual three-dimensional space, and the characters are projected onto a display screen (two-dimensional plane) where a game play proceeds. The characters are defined with three-dimensional coordinates. Motions of the characters are generated by coordinate transformation, depending on an operation by a player who plays a game, and is finally transformed and projected onto a two-dimensional plane, so that the character is displayed on the display screen.

When all the characters are defined with the coordinates of polygons, the motions of the characters may be controlled by transforming all the polygon coordinates. However, in this case, the control is complicated in terms of processing. Therefore, the skeleton of each character is defined with a plurality of bones and joints like, for example, a human, and the motion of the character is defined with the bones and the joints, whereby the control is considerably simplified in terms of processing. For example, this technique is described in Tim Coleman and Sherri Sheridan, "Mezase Puroanimeta Maya Kyarakuta Animeshon (Maya Character Animation—For Aspiring Professional Animators)", 1st Ed., Kabushiki Kaisha Bone Digital, Apr. 25, 2005, pp. 125-133 (hereinafter referred to as Publication 1). Software introduced in Publication 1 is a typical method of controlling the motion of a character, in which the user can use a computer to generate a character which is drawn in a desired three-dimensional space, and generate animation of the character generated in the three-dimensional space.

For example, Japanese Patent Laid-Open Publication No. H10-188028 (hereinafter referred to as Publication 2) discloses a moving image generating device in which the bones and joints (skeleton in Publication 2) is applied to a deformed game character. In general, a deformed character which has less joints and less irregular surfaces tends to be monotonically expressed. However, if bones and joints are hidden in the deformed character disclosed in Publication 2 and the bones and the joints are controlled, it is possible to confer various facial expressions to the deformed character. Publication 2 also discloses a technique of selecting animation which is based on bones and joints previously set, depending on an input from a controller connected to the moving image generating device, and drawing the animation as game images as appropriate.

Although Publication 1 discloses the definition of bones and joints and the technique of producing animation using the bones and the joints, Publication 1 does not disclose how to apply the technique to a game play.

Although, in Publication 2, a motion of a character to be drawn is selected, depending on the input from the controller, Publication 2 does not disclose a direct control of the motion of the character.

SUMMARY

Therefore, a feature of an example embodiment presented herein is to provide a game apparatus and a storage medium storing a game program which can directly control a portion of a character through a touch panel, the character being displayed on a display screen covered with a touch panel. Another feature of the example embodiment is to provide a game apparatus and a storage medium storing a game program which can cause a motion of a character to change, depending on a portion thereof touched through a touch operation on a touch panel, and provide a realistic experience in which the player feels as if he or she actually touched the character.

The example embodiment has the following features to attain the above. Note that reference numerals and step numbers (abbreviated as "S") in parentheses indicate correspondence between parts and steps herein described and those described in the accompanying drawings so as to aid understanding of the example embodiment, and are not intended to limit the scope of the example embodiment.

A first aspect of the example embodiment presented herein is directed to a game apparatus (1) for a game which causes a character appearing in a game space to produce a motion, depending on an operation of a player. The game apparatus comprises a display section (12), a touch panel (13), a touch operation input data storing section (S71, 228), a structure data storing section (231a), a polygon data storing section (231b), a character position control section (S54, S55), a character display control section (S52, S77), a touched portion detecting section (S56, S74), and a joint angle changing section (S76). The display section displays an image of a character on a display screen. The touch panel is provided, covering the display screen of the display section. The touch operation input data storing section temporarily stores touch operation input data (touch coordinates) input through a touch operation on the touch panel. The structure data storing section stores structure data (FIG. 7) of the character, in which the character has a plurality of bones (B) and one or more joints (J), and the plurality of bones are joined together with the joints. The polygon data storing section stores polygon data (Po) for each portion of the character defined corresponding to each of the plurality of bones. The character position control section controls a position of the character in the game space. The character display control section draws and displays the character on the display screen based on the structure data, the polygon data, and the position of the character. The touched portion detecting section calculates position data (game space coordinates) in the game space corresponding to the touch operation input data to detect a portion of the character corresponding to the position data. When the portion of the character corresponding to the position data is detected, the joint angle changing section changes an angle ($\theta$) of a joint of the character corresponding to the portion, depending on the touch operation input data (FIG. 9). The character display control section moves a portion whose joint angle is changed by the joint angle changing section, in real time, depending on the angle, and draws and displays the character on the display screen.

In a second aspect, the game apparatus further comprises a touch operation state determining section (S75, S78) of determining a touch operation state with respect to the touch panel based on the touch operation input data. When the touch operation state determining section determines that the touch operation state is a drag operation in which a position of the touch operation is continuously changed, the joint angle changing section changes the joint angle of the character, depending on a direction of the drag operation.

In a third aspect, the game apparatus further comprises an animation data storing section (232), an accumulated amount calculating section (S77), and an animation selecting section (S77). The animation data storing section previously stores a plurality of patterns (232a to 232f) of motions of positions of the bones and the joints of the character. When the touch operation state determining section determines that the touch operation state is a drag operation in which a position of the touch operation is continuously changed, the accumulated amount calculating section accumulates an operation distance of the drag operation. The animation selecting section selects a pattern stored in the animation data storing section, depending on the operation distance accumulated by the accumulated amount calculating section. The character display control section draws and displays the character on the display screen, depending on the pattern selected by the animation selecting section.

In a fourth aspect, the game apparatus further comprises an area setting section (ZL and ZR in FIGS. 10A to 10C). The area setting section sets an area in which a joint angle changed by the joint angle changing section is specified, to be at least a portion of a portion of the character. When the position data corresponding to the touch operation input data indicates an inside of the area set by the area setting section, the joint angle changing section changes the joint angle of the character in accordance with the angle specified in the area.

In a fifth aspect, the area setting section divides a portion of the character into two areas, and the areas specify the same angle and opposite rotational directions, in accordance with which the joint angle is changed.

In a sixth aspect, the area setting section sets a direction, along which the two areas are divided, to be consistently fixed in a world coordinate system of the game space.

A seventh aspect of the example embodiment is directed to a storage medium storing a game program which is executed by a computer (21) of a game apparatus for a game which causes a character appearing in a game space to produce a motion, depending on an operation of a player. The game apparatus comprises a display section of displaying the game space on a display screen, a touch panel provided, covering the display screen of the display section, and a storing section (22). The game program causes the computer to execute a touch operation input data storing step (S71), a character position control step (S54, S55), a character display control step (S52, S77), a touched portion detecting step (S56, S74), and a joint angle changing step (S76). The touch operation input data storing step temporarily stores touch operation input data input through a touch operation on the touch panel. The character position control step controls a position of the character in the game space. The character display control step draws and displays the character on the display screen based on structure data of the character having a plurality of bones and one or more joints, wherein the plurality of bones are joined together with the joints, polygon data for each portion of the character defined corresponding to each of the plurality of bones, and the position of the character. The touched portion detecting step calculates position data in the game space corresponding to the touch operation input data to detect a portion of the character corresponding to the position data. The joint angle changing step, when the portion of the character corresponding to the position data is detected, changes an angle of a joint of the character corresponding to the portion, depending on the touch operation input data. The character display control step moves the portion whose joint angle is changed by the joint angle changing step, in real time, depending on the angle, and draws and displays the character on the display screen.

In an eighth aspect, the game program further causes the computer to execute a touch operation state determining step (S75, S78). The touch operation state determining step determines a touch operation state with respect to the touch panel based on the touch operation input data. When the touch operation state determining step determines that the touch operation state is a drag operation in which a position of the touch operation is continuously changed, the joint angle changing step changes the joint angle of the character, depending on a direction of the drag operation.

In a ninth aspect, the game program further causes the computer to execute an accumulated amount calculating step (S77) and an animation selecting step (S77). The accumulated amount calculating step, when the touch operation state determining step determines that the touch operation state is a drag operation in which a position of the touch operation is continuously changed, accumulates an operation distance of the drag operation. The animation selecting step selects one of a plurality of patterns indicating motions of positions of the bones and the joints of the character, depending on the operation distance accumulated by the accumulated amount calculating step. The character display control step draws and displays the character on the display screen, depending on the pattern selected by the animation selecting step.

In a tenth aspect, the game program further causes the computer to execute an area setting step (ZL and ZR in FIGS. 10A to 10C). The area setting step sets an area in which a joint angle changed by the joint angle changing step is specified, to be at least a portion of a portion of the character. When the position data corresponding to the touch operation input data indicates an inside of the area set by the area setting step, the joint angle changing step changes the joint angle of the character in accordance with the angle specified in the area.

In an eleventh aspect, the area setting step divides a portion of the character into two areas, and the areas specify the same angle and opposite rotational directions, in accordance with which the joint angle is changed.

In a twelfth aspect, the area setting step sets a direction, along which the two areas are divided, to be consistently fixed in a world coordinate system of the game space.

According to the first aspect, a joint angle provided to a portion of a character touched through a touch panel can be directly controlled. Therefore, since the joint angle can be changed, depending on the touch operation, it is possible to provide a game apparatus which can provide an operation which causes the player to feel as if he or she touched the character. Also, since the touch operation through the touch panel causes the character to produce a motion in real time in accordance with the joint angle, it is possible to cause the character to act in various manners.

According to the second aspect, when the portion of the character is a head or the like, the character can be expressed as if the character moves the head thereof, depending on a direction of a drag operation, such as stroking the touch panel or the like. Therefore, since it can be expressed that the character moves the head thereof, it is possible to provide a game apparatus which provides the realistic sensation of touching a character.

According to the third aspect, a character is drawn while changing a pattern (e.g., a posture, etc.), depending on the accumulated amount of a drag operation with respect to the character. Therefore, it is possible to provide a game apparatus which provides the realistic sensation of communicating with the character.

According to the fourth aspect, since a joint angle is changed by an angle specified by an area provided in a portion of a character joint, the joint angle can be easily controlled.

According to the fifth aspect, since a portion of a character belongs either of two areas, it is possible to avoid a situation where an angle is not controlled, as long as the portion is subjected to a touch operation. Therefore, the character behaves naturally. Also, by performing a touch operation which reciprocates between the two areas, it can be expressed that the portion of the character performs a reciprocating motion.

According to the sixth aspect, a direction of a border between the two areas does not vary depending on a change in the joint angle. Therefore, it is possible to prevent the areas from switching due to the change in the joint angle with respect to the same touch operation position. Therefore, the portion of the character can be moved by the player moving the touch operation position.

Further, according to the storage medium storing a game program of the example embodiment presented herein, an effect similar to that of the above-described game apparatus can be obtained by causing a computer to execute the game program.

These and other features, aspects and advantages of the example embodiment will become more apparent from the following detailed description of the example embodiment when taken in conjunction with the accompanying drawings.

BRIEF DESCRIPTION OF THE DRAWINGS

FIG. 8 is a diagram for describing coordinate axes set in a bone B and a joint J;

DESCRIPTION OF THE PREFERRED EMBODIMENTS

Figure 1:
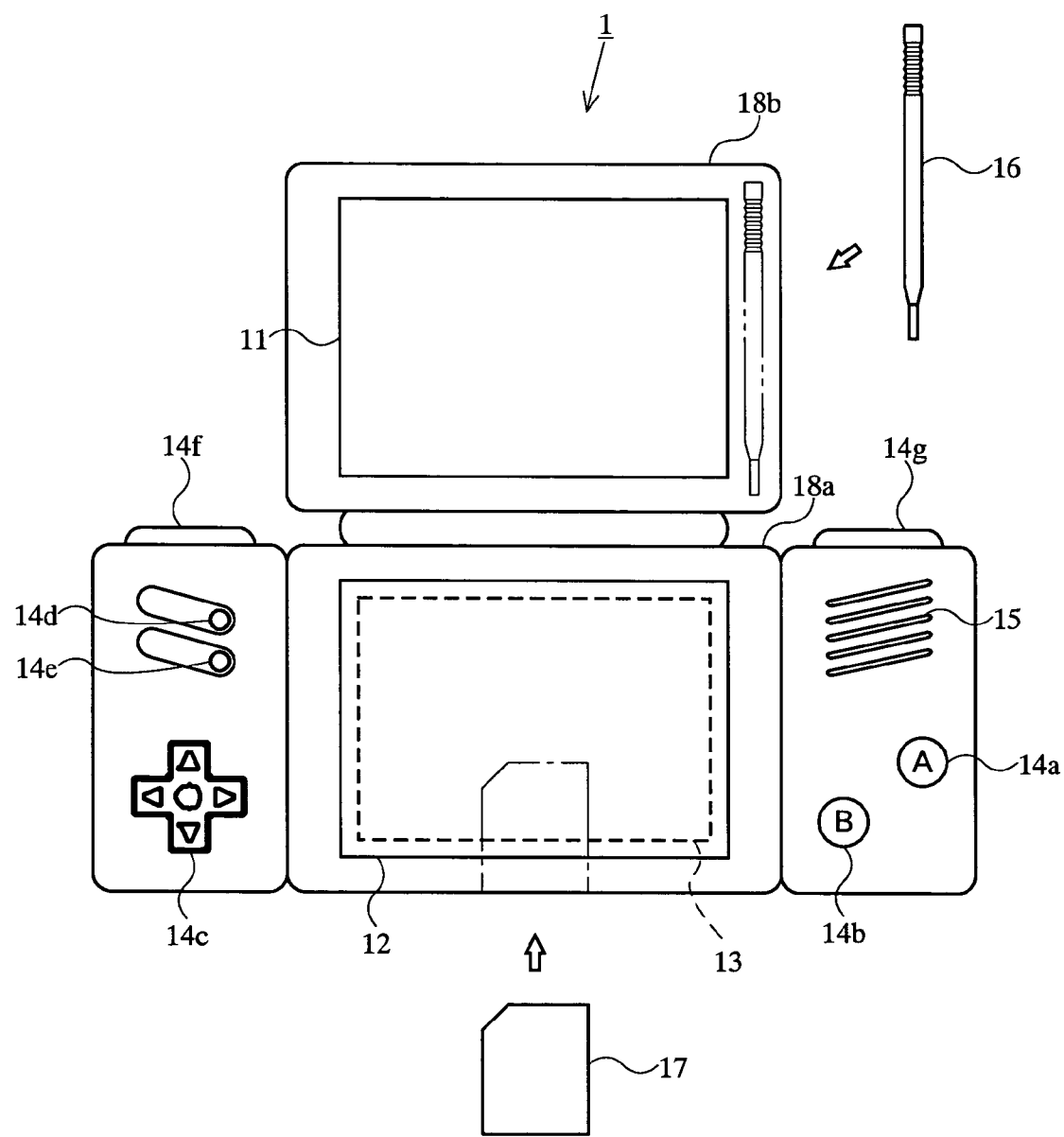
FIG. 1 is an external view illustrating a game apparatus according to an embodiment which executes a game program.

A game apparatus for executing a game program according to an embodiment will be described with reference to the accompanying drawings. FIG. 1 is an external view of a game apparatus 1 of the example embodiment which executes a game program. As an example of the game apparatus 1, a hand-held game apparatus will be hereinafter illustrated.

Referring to FIG. 1, the game apparatus 1 of the embodiment includes two liquid crystal displays (LCDs) 11 and 12 which are housed in a housing 18 and are disposed at predetermined positions. Specifically, when the first liquid crystal display (hereinafter referred to as an "LCD") 11 and the second LCD 12 are vertically disposed and housed, the housing 18 is composed of a lower housing 18a and an upper housing 18b, and the upper housing 18b is rotatably supported at a portion of an upper edge of the housing 18a. The upper housing 18b has a planar shape which is slightly larger than that of the first LCD 11. An opening is formed on a major surface of the upper housing 18b so that a display screen of the first LCD 11 is exposed therefrom. The lower housing 18a has a planar shape which is longer in a horizontal direction than the upper housing 18b. An opening is formed at substantially a middle portion in the horizontal direction of the lower housing 18a so that a display screen of the second LCD 12 is exposed therefrom. Holes through which sound of the loudspeaker 15 passes is defined on either a right portion or a left portion of the lower housing 18a thereon which sandwich the second LCD 12, and operation switch sections 14 are positioned in both the right portion and the left portion of the lower housing 18a which sandwich the second LCD 12.

The operation switch sections 14 include an operation switch (button A) 14a and an operation switch (button B) 14b positioned in a right side of the second LCD 12 and on the major surface of the lower housing 18a, a direction specifying switch (cross key) 14c positioned in a left side of the second LCD 12 and on the major surface of the lower housing 18a, a start switch 14d, a select switch 14e, and side switches 14f and 14g. The operation switches 14a and 14b are used to, for example, input an instruction to pass, shoot, or the like in a sport game, such as a soccer game or the like; an instruction to jump, punch, operate a weapon, or the like in an action game; or an instruction to obtain an item, or select and confirm a weapon or a command, or the like in a role playing game (RPG) or a simulation RPG. The direction specifying switch 14c is used to specify on a game screen a direction, such as a movement direction of a player object (or a player character) which can be operated by the player using the operation switch section 14, a movement direction of a cursor, or the like. The side switch (button L) 14f and the side switch (button R) 14g are provided on a right portion and a left portion of an upper surface (upper side surface) of the lower housing 18a. More operation switch(es) may be added as required.

Further, a touch panel 13 (an area surrounded by a dashed line in FIG. 1) is attached on a top surface of the second LCD 12. The touch panel 13 may be of any type including, for example, a resistance film type, an optical (infrared) type, and an electrostatic capacitance coupling type, and is a two-dimensional pointing device which detects a coordinate position of a stylus 16 (or a finger) and outputs coordinate data when a top surface thereof is pressed or stroked using the stylus 16 or the stylus 16 is moved on the top surface.

A holding hole (an area surrounded by a dash-dot-dot line in FIG. 1) for holding the stylus 16 for operating the touch panel 13 is formed adjacent to a side surface of the upper housing 18b. The stylus 16 is held in the holding hole. A cartridge insertion section (an area surrounded by a dash-dot line in FIG. 1) for detachably connecting a game cartridge 17 with a built-in memory (e.g., a ROM) storing a game program (hereinafter simply referred to as a cartridge 17) is formed in a portion of a side surface of the lower housing 18a. The cartridge 17 is a data storage medium storing a game program, such as, for example, a nonvolatile semiconductor memory (e.g., a ROM or a flash memory). A connector (see FIG. 2) for electrically connecting to the cartridge 17 is provided inside the cartridge insertion section. The lower housing 18a (or the upper housing 18b) also houses an electronic circuit board on which various electronic parts (e.g., a CPU, etc.) are secured. Note that the information storage medium for storing a game program is not limited to the nonvolatile semiconductor memory, and may be a CD-ROM, a DVD, or other similar optical disc-shaped storage media.

Figure 2:
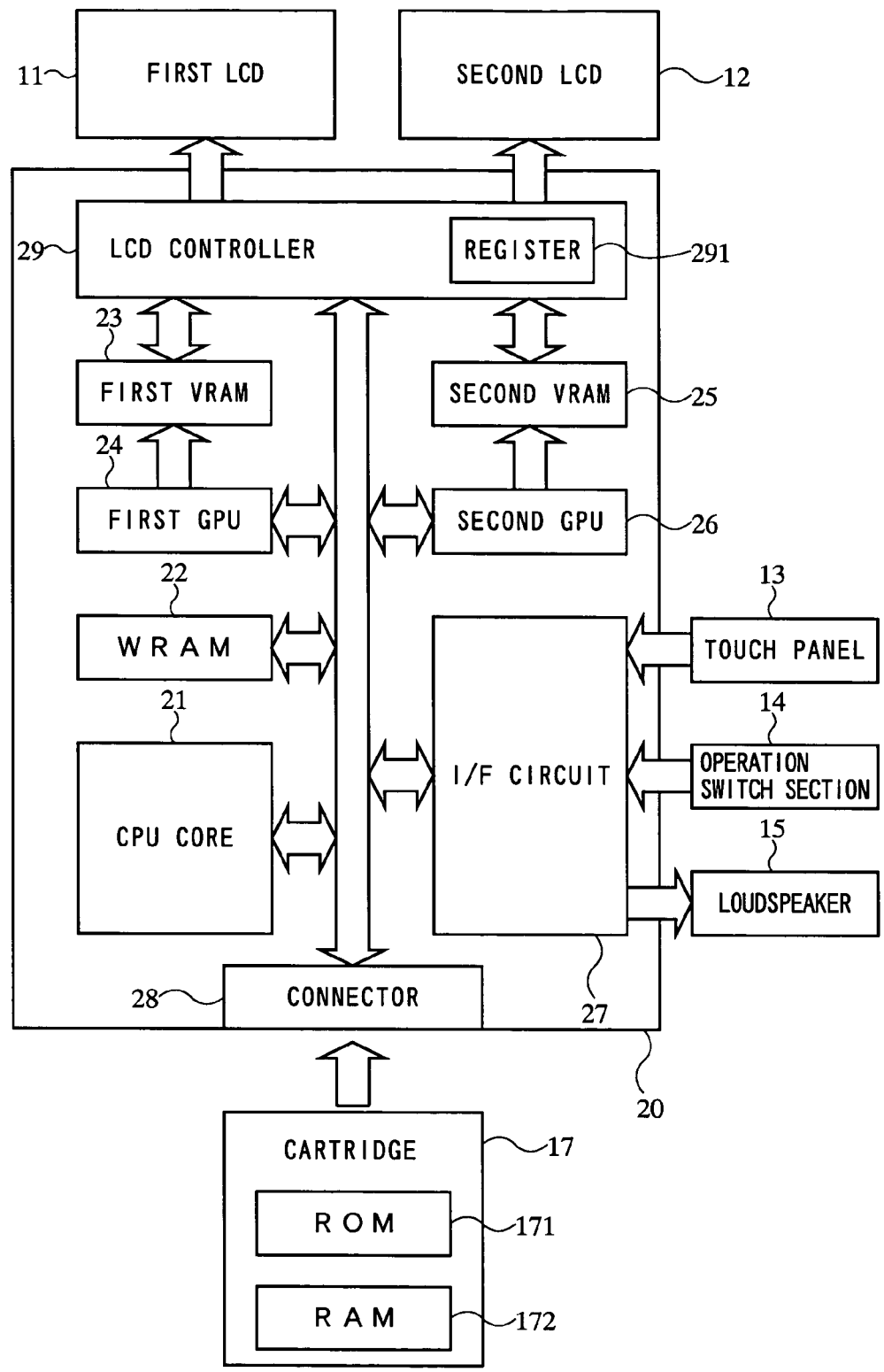
FIG. 2 is a block diagram illustrating the game apparatus 1 of FIG. 1.

FIG. 2 is a block diagram illustrating the game apparatus 1. In FIG. 2, a CPU core 21 is fixedly mounted on an electronic circuit board 20 housed in the housing 18. A connector 28, and in addition, an I/O interface (I/F) circuit 27, a first graphics processing unit (first GPU) 24, a second graphics processing unit (second GPU) 26, a WRAM 22, and an LCD controller 29, are connected via a predetermined bus to the CPU core 21. The cartridge 17 is detachably connected to the connector 28. The cartridge 17 is a storage medium for storing a game program. Specifically, the cartridge 17 carries a ROM 171 storing the game program and a RAM 172 for storing rewritable backup data. The game program stored in the ROM 171 of the cartridge 17 is loaded into the WRAM 22, and the game program loaded in the WRAM 22 is executed by the CPU core 21. The CPU core 21 stores temporary data which is generated by executing the game program, or data for generating an image, into the WRAM 22. The operation switch section 14 and the touch panel 13, and in addition, the loudspeaker 15, are connected to the I/F circuit 27.

A first video RAM (first VRAM) 23 is connected to the first GPU 24, while a second video RAM (second VRAM) 25 is connected to the second GPU 26. The first GPU 24 generates a first game image based on data for generating the image, the data being stored in the WRAM 22, depending on an instruction from the CPU core 21, and draws (stores) the first game image in the first VRAM 23. The second GPU 26 generates a second game image based on data for generating the image, the data being stored in the WRAM 22, depending on an instruction from the CPU core 21, and draws (stores) the second game image in the second VRAM 25. The first VRAM 23 and the second VRAM 25 are connected to the LCD controller 29.

The LCD controller 29 includes a register 291. The register 291 stores a value of 0 or 1, depending on an instruction from the CPU core 21. When the value of the register 291 is 0, the LCD controller 29 outputs the game image drawn in the first VRAM 23 to the first LCD 11, and the game image drawn in the second VRAM 25 to the second LCD 12. When the value of the register 291 is 1, the LCD controller 29 outputs the game image drawn in the first VRAM 23 to the second LCD 12, and the game image drawn in the second VRAM 25 to the first LCD 11.

The I/F circuit 27 is a circuit which transfers data between an external I/O device (e.g., the operation switch section 14, the touch panel 13, the loudspeaker 15, etc.) and the CPU core 21. The touch panel 13 (including a device driver for the touch panel) has a coordinate system corresponding to a coordinate system of the second VRAM 25, and outputs position coordinate data corresponding to a position input (specified) by the stylus 16. Note that, in this example, the display screen of the second LCD 12 has a resolution of 256 dots×192 dots, while the touch panel 13 has a detection precision of 256 dots×192 dots corresponding to the display screen of the second LCD 12. Alternatively, the detection precision of the touch panel 13 may be either lower or higher than the resolution of the display screen of the second LCD 12.

Hereinafter, a specific exemplary display screen provided by a game program executed by the game apparatus 1 will be described with respect to FIGS. 3 to 6. Note that FIGS. 3 to 6 each illustrate an exemplary game screen displayed on the second LCD 12.

Figure 3:
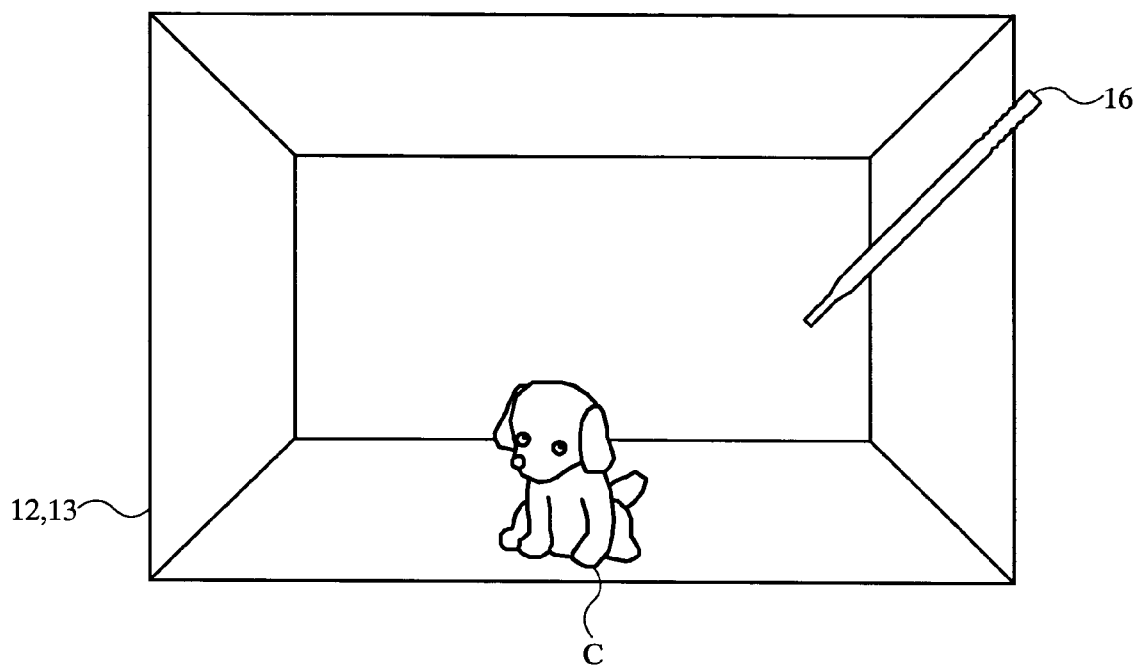
FIG. 3 is a diagram illustrating an exemplary game screen displayed on a second LCD 12 of FIG. 1.

As illustrated in FIG. 3, a game executed by the game apparatus 1 in this example has a game space, a portion of which is displayed on at least the second LCD 12. Specifically, in the game, a plurality of characters C (a dog is displayed as a character C in FIG. 3) appear in the game space, and the player plays with the characters C through the touch panel 13.

Figure 4:
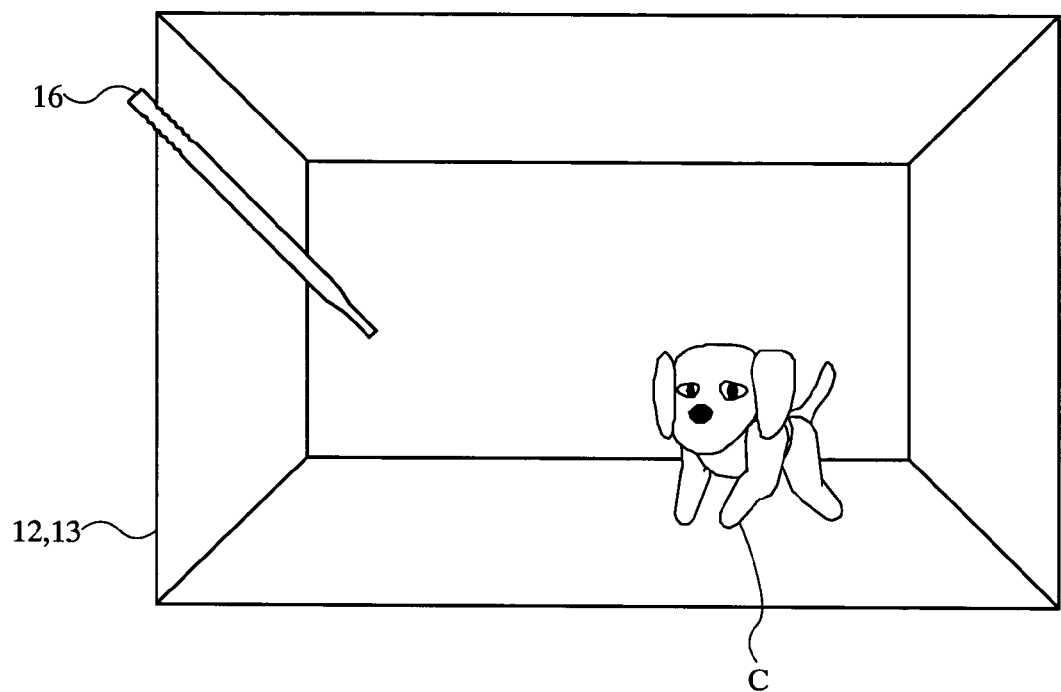
FIG. 4 is a diagram illustrating another exemplary game screen displayed on the second LCD 12 of FIG. 1.
Figure 5:
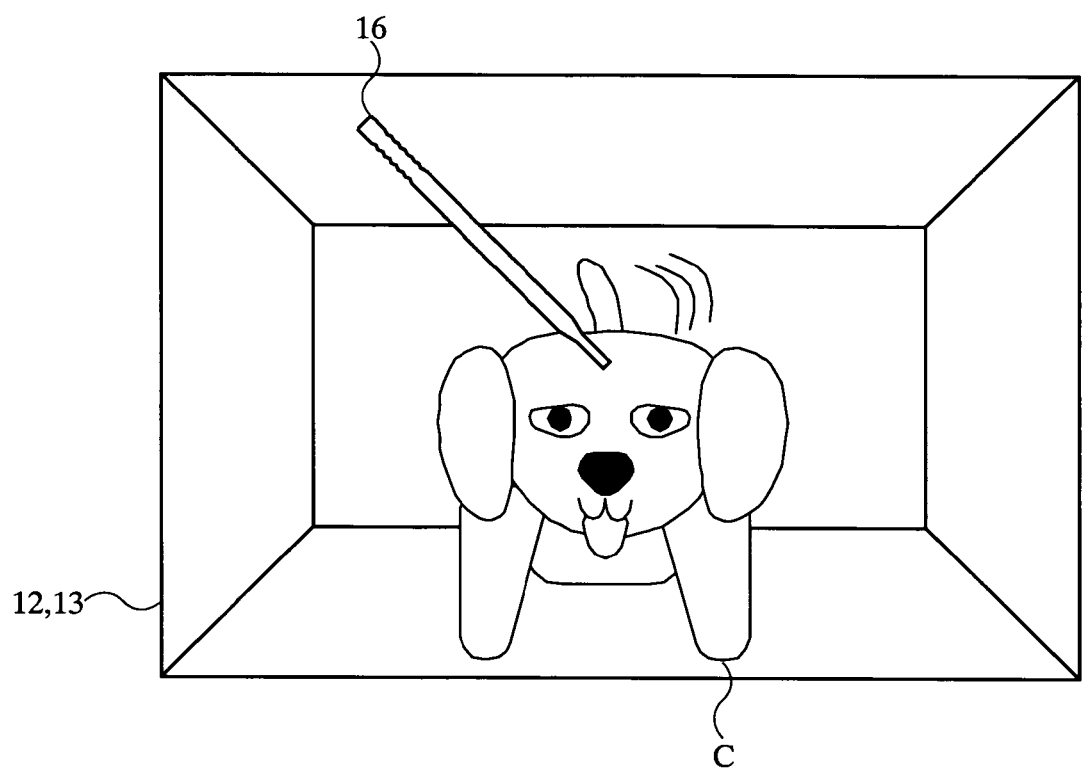
FIG. 5 is a diagram illustrating another exemplary game screen displayed on the second LCD 12 of FIG. 1.

In FIG. 4, for example, when the player touches any point on the touch panel 13 using the stylus 16, the character C is attracted and moved toward game space coordinates corresponding to touch panel coordinates (touch coordinates) of the touched point. As illustrated in FIG. 5, the character C behaves so that a predetermined point (e. g., a predetermined point on a front part of a head) of the character C eventually coincides the game space coordinates corresponding to the touch coordinate position. According to these operations, the character C is expressed as if the character C came to the position on the touch panel 13 touched by the player. Further, since the character C behaves as if the predetermined point struck the position, the player feels as if the character C came when he or she called.

Thereafter, as illustrated in the upper figure of FIG. 6, when the player drags the stylus 16 from the touched position of FIG. 5 to the left (a direction U in FIG. 6) while keeping touching the touch panel 13 (hereinafter simply referred to as a drag operation, the character C behaves as if the character C moved the head thereof in a left rotational direction (a direction L in FIG. 6) in response to the leftward drag operation. Also, as illustrated in the lower figure of FIG. 6, when the player performs a rightward (a direction V in FIG. 6) drag operation on the touch panel 13, the character C behaves as if the character C moved the head thereof in a right rotational direction (a direction R in FIG. 6) in response to the rightward drag operation. In other words, when the player performs a touch operation as if he or she stroked the head of the character C through the touch panel 13, the character C moves the head thereof from side to side. Therefore, it looks as if the player stroked the real character C and the character C responded to this. In addition, a facial expression or a posture of the character C is changed based on animation data, depending on the amount of accumulated operations (drag operations) performed by the player with respect to a predetermined portion of the character C.

Figure 7:
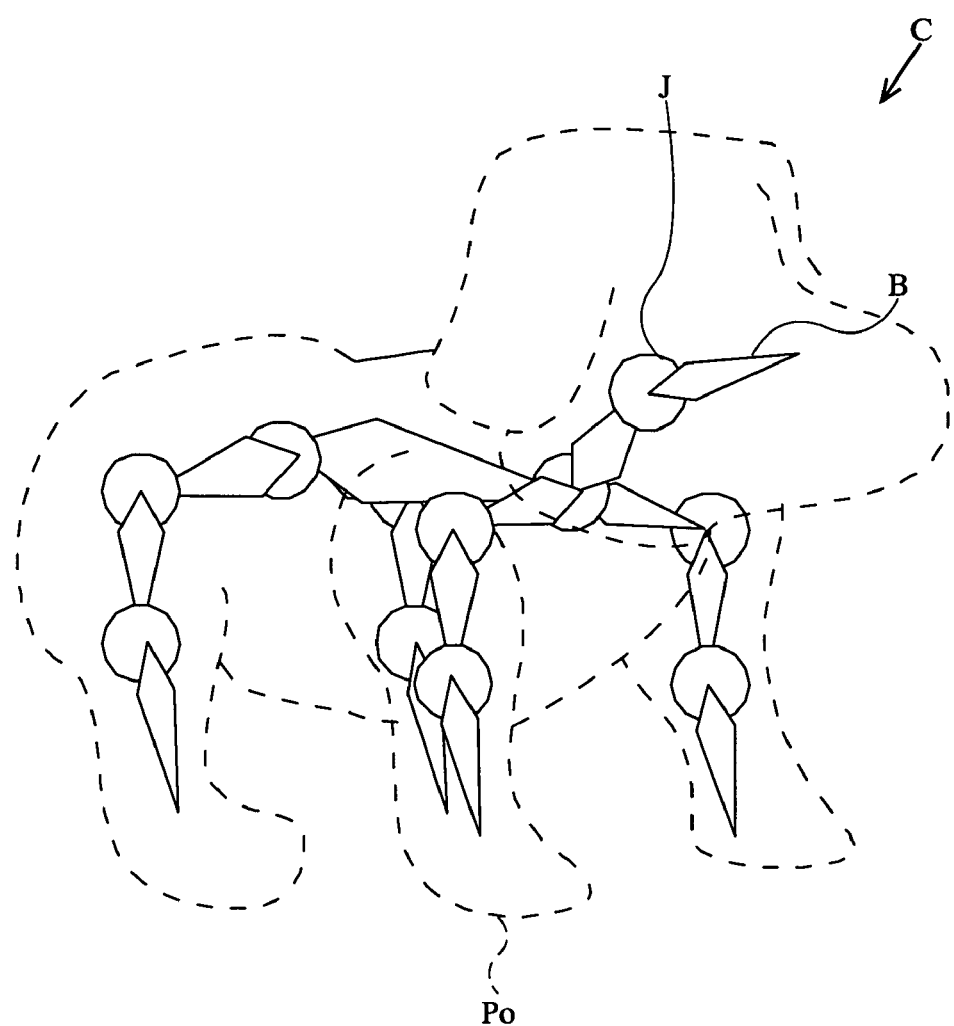
FIG. 7 is a diagram illustrating a data structure of a character C.
Figure 9:
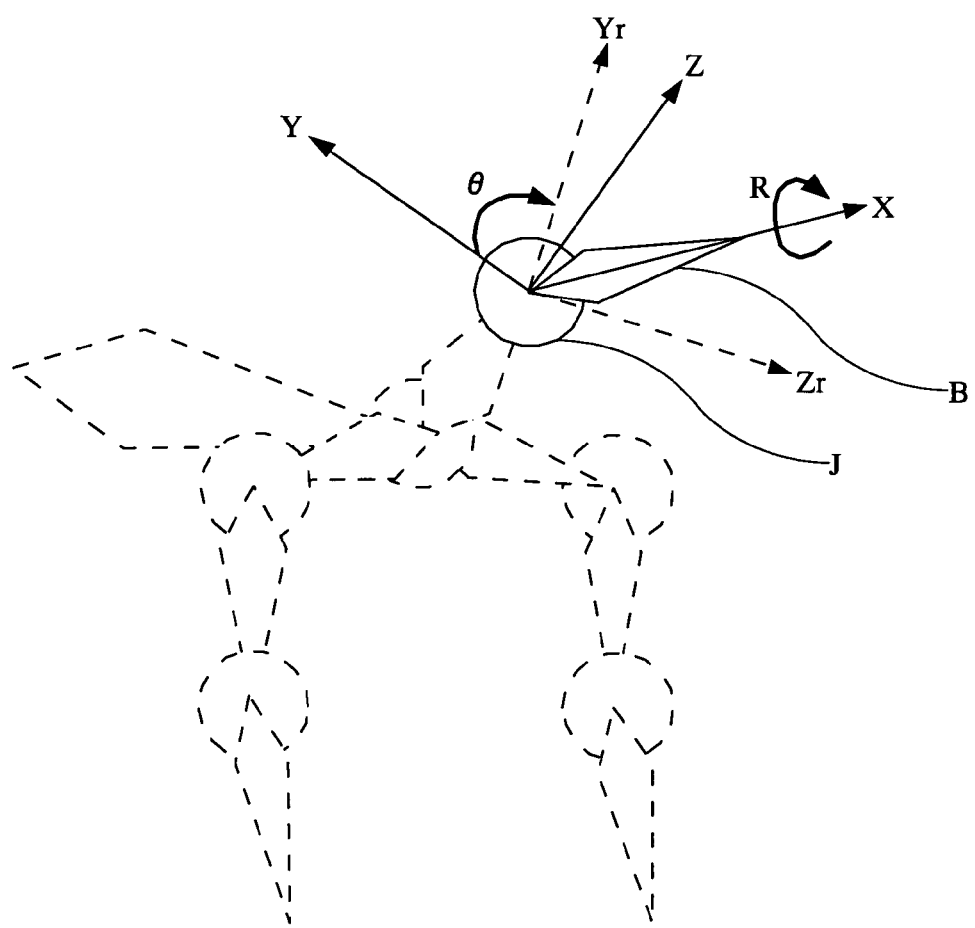
FIG. 9 is a diagram for describing a rotational operation of a joint J corresponding to an exemplary motion of the character C.
Figure 10A:
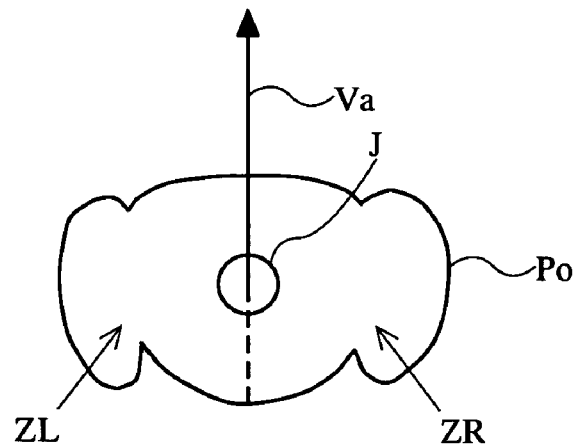
FIGS. 10A to 10C are diagrams illustrating areas ZL and ZR in which a rotational angle and a direction of a joint J are determined, depending on a touch operation.
Figure 10B:
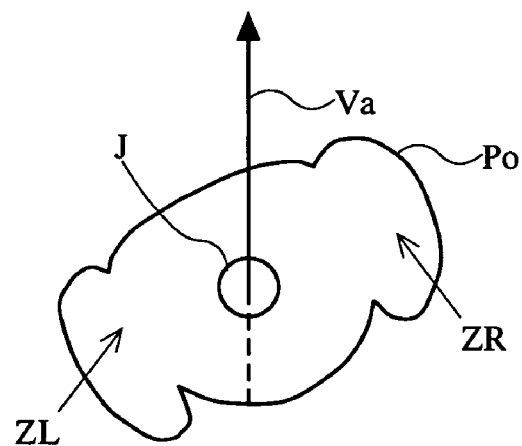
Figure 10C:
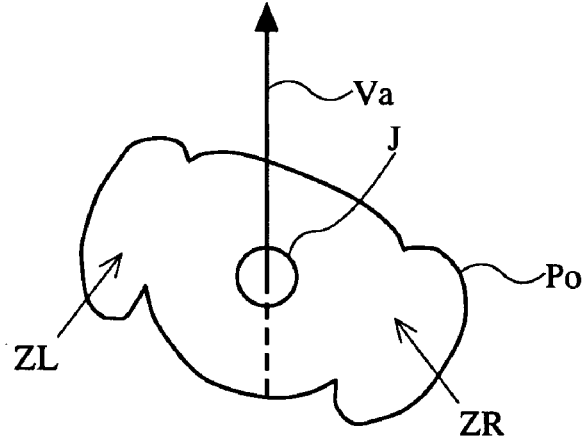

Hereinafter, a data structure of the character C will be described with reference to FIGS. 7 to 10C. FIG. 7 is a diagram illustrating the data structure of the character C. FIG. 8 is a diagram for explaining coordinate axes of a bone B and a joint J. FIG. 9 is a diagram for describing a rotational operation of the joint J corresponding to an exemplary behavior of the character C. FIGS. 10A to 10C are diagrams illustrating areas ZL and ZR which determine a rotational angle and a direction of the joint J, depending on the touch operation.

Referring to FIG. 7, a skeleton of the character C is defined using a plurality of bones B (represented by polygons in FIG. 7) and a plurality of joints J (represented by spheres in FIG. 7) which are structure data. Thus, the character C has bones and joints like an animal. Also, the character C, when drawn, has a surface composed of a required number of polygon data Po (indicated with a dashed line in FIG. 7) defined corresponding to the bones B. In addition, texture data is mapped to the polygon data Po, thereby obtaining a three-dimensional representation of the character C.

The bones B are joined together by the joints J. The bone B can be moved by, for example, rotating or moving the joint J. By drawing the character C while changing positions and angles of the polygon data Po defined by the bones B, depending on the motions of the bones B, the character C is expressed as if the character C were acting.

Referring to FIG. 8, three-dimensional coordinates X, Y, and Z are defined for each pair of a joint J and a bone B of the character C. A direction of the bone B passing through a center of the joint J is defined as the X axis. The Y and Z axes are defined on a plane which passes through the center of the joint J and is perpendicular to the bone B. The X, Y, and Z axes are perpendicular to each other and intersect at the center of the joint J.

As have been described with reference to the lower figure of FIG. 6, when the player drags the head of the character C to the right on the touch panel 13, the character C behaves as if the character C moved the head thereof in the right rotational direction. Movements of the joint J and the bone B in the above-described situation will be described with reference to FIG. 9. For example, the joint J joining the bone B which defines the polygon data Po representing the head of the character C is moved, depending on the drag operation (the bone B and the joint J indicated with a solid line in FIG. 9). Specifically, the joint J of interest is rotated by an angle of θ in a right rotational direction (a direction R in FIG. 9) about the X axis indicating the direction of the bone B. Thereby, the Y axis is shifted to the position of an Yr axis of FIG. 9, and the Z axis is shifted to the position of a Zr axis of FIG. 9. By this rotation, the polygon data Po defined by the bone B of interest is rotated by the angle of θ in the direction R of FIG. 9. By the rotation of the joint J, the second LCD 12 displays the character C as if the character C moved the head thereof in the right rotational direction (the lower figure of FIG. 6).

Next, the touch coordinates of a touched position and the rotational angle and direction of the joint J will be described with reference to FIGS. 10A to 10C. As illustrated in FIG. 10A, the left rotation area ZL and the right rotation area ZR are set with respect to the polygon data Po (e.g., the head of a dog) of the character C which is to be subjected to the above-described rotational operation. An angle reference vector Va is provided in a vertically upward direction in a world coordinate system from the center of the joint J joining the bone B defining the polygon data Po. Note that the direction of the angle reference vector Va is fixed to the vertically upward direction in the world coordinate system. The polygon data Po is divided into two areas by the angle reference vector Va, and the two areas are the left rotation area ZL and the right rotation area ZR. Specifically, when the polygon data Po corresponds to the head, substantially a right half of the head (substantially a left half when viewed from the front) is set to be the left rotation area ZL, while substantially a left half of the head (substantially a right half when viewed from the front) is set to be the left rotation area ZL.

Figure 6:
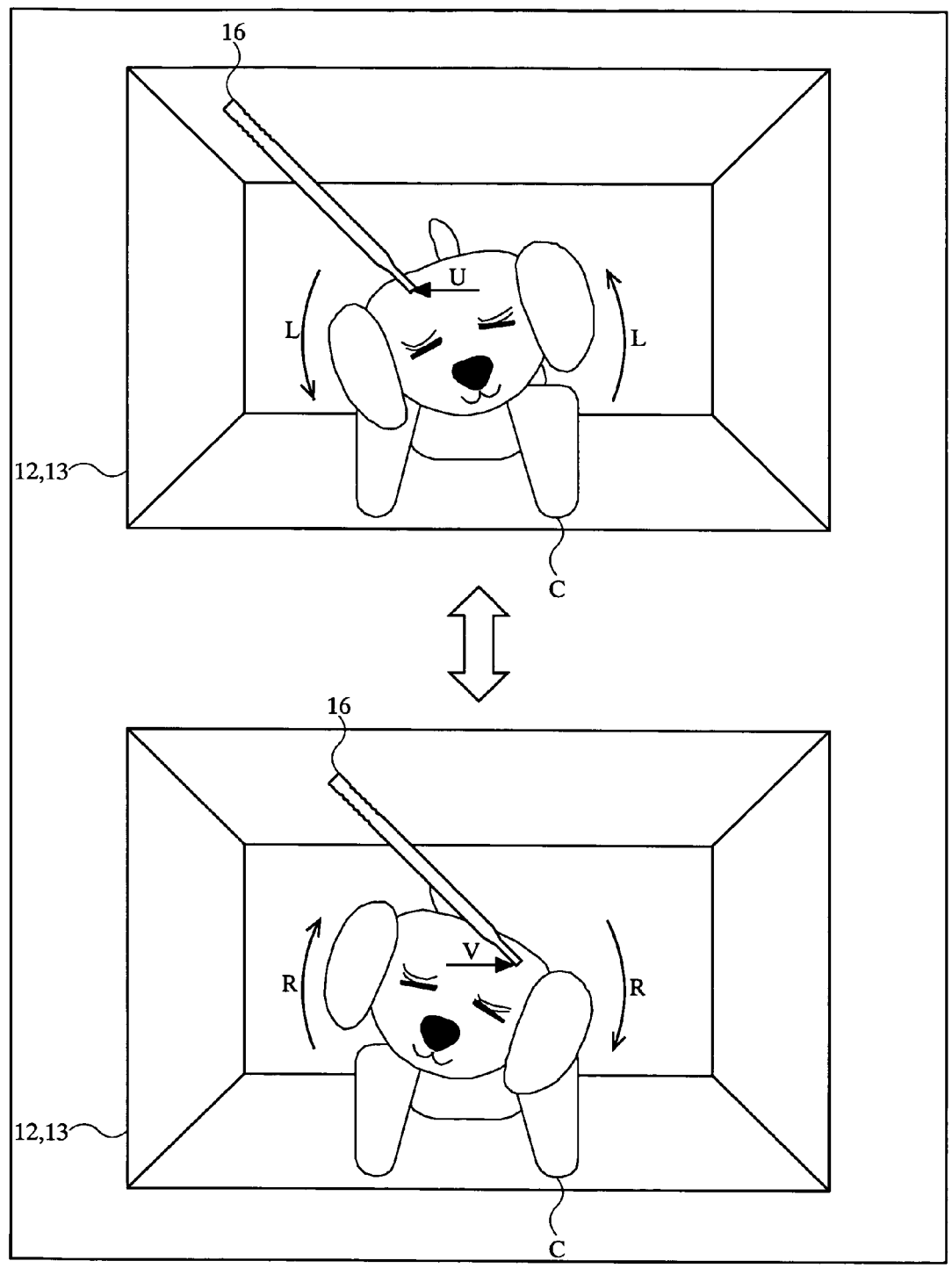
FIG. 6 is a diagram illustrating another exemplary game screen displayed on the second LCD 12 of FIG. 1.

As have been described using the upper figure of FIG. 6, when the player drags the head of the character C to the left on the touch panel 13, game space coordinates corresponding to touch coordinates input by the drag operation fall within the left rotation area ZL. When the left rotation area ZL is specified by the drag operation, the joint J is rotated by an angle of θ in a left rotational direction (when viewed from the front) about the X axis indicating the direction of the bone B. As illustrated in FIG. 10B, this rotation causes the polygon data Po (head) defined by the bone B of interest to rotate by the angle of θ in the left direction when viewed from the front. Note that the direction of the angle reference vector Va is fixed, and therefore, the direction does not vary depending on the rotational operation. Therefore, the left rotation area ZL and the right rotation area ZR set in the polygon data Po vary depending on the above-described rotational operation as illustrated in FIG. 10B.

On the other hand, as have been illustrated using the lower figure of FIG. 6, when the player drags the head of the character C to the right on the touch panel 13, game space coordinates corresponding to touch coordinates input by the drag operation fall within the right rotation area ZR. When the right rotation area ZR is specified by the drag operation, the joint J is rotated by an angle of θ in a right rotational direction (when viewed from the front) about the X axis indicating the direction of the bone B. As illustrated in FIG. 10C, this rotation causes the polygon data Po (head) defined by the bone B of interest to rotate by the angle of θ in the right direction when viewed from the front. Note that the direction of the angle reference vector Va is fixed, and therefore, the direction does not vary depending on the rotational operation. Therefore, the left rotation area ZL and the right rotation area ZR set in the polygon data Po vary depending on the above-described rotational operation as illustrated in FIG. 10C. Therefore, when the player performs a drag operation as if the head of the character C moved across the angle reference vector Va, the character C behaves as if the character C moved the head thereof by an angle of θ from left to right or vice versa.

As described above, when the player performs a touch operation so that the head of the character C (e.g., a front part of the head), which is displayed on the second LCD 12 covered with the touch panel 13, is stroked through the touch panel 13, the character C is caused to act as if the head thereof were moved from side to side, and the real character C were stroked. In other words, when the player performs a drag operation to stroke the touch panel 13, the angle of the joint J set in the head of the character C, which is a three-dimensional object, varies depending on the direction of the drag operation, whereby the character C is caused to act as if the character C responded when the head thereof were stroked. Therefore, it is possible to cause the character C to act in various manners by touch operations on the touch panel 13 which cause the three-dimensional character C to produce a motion in real time in accordance with the angle of the joint J.

Figure 11:
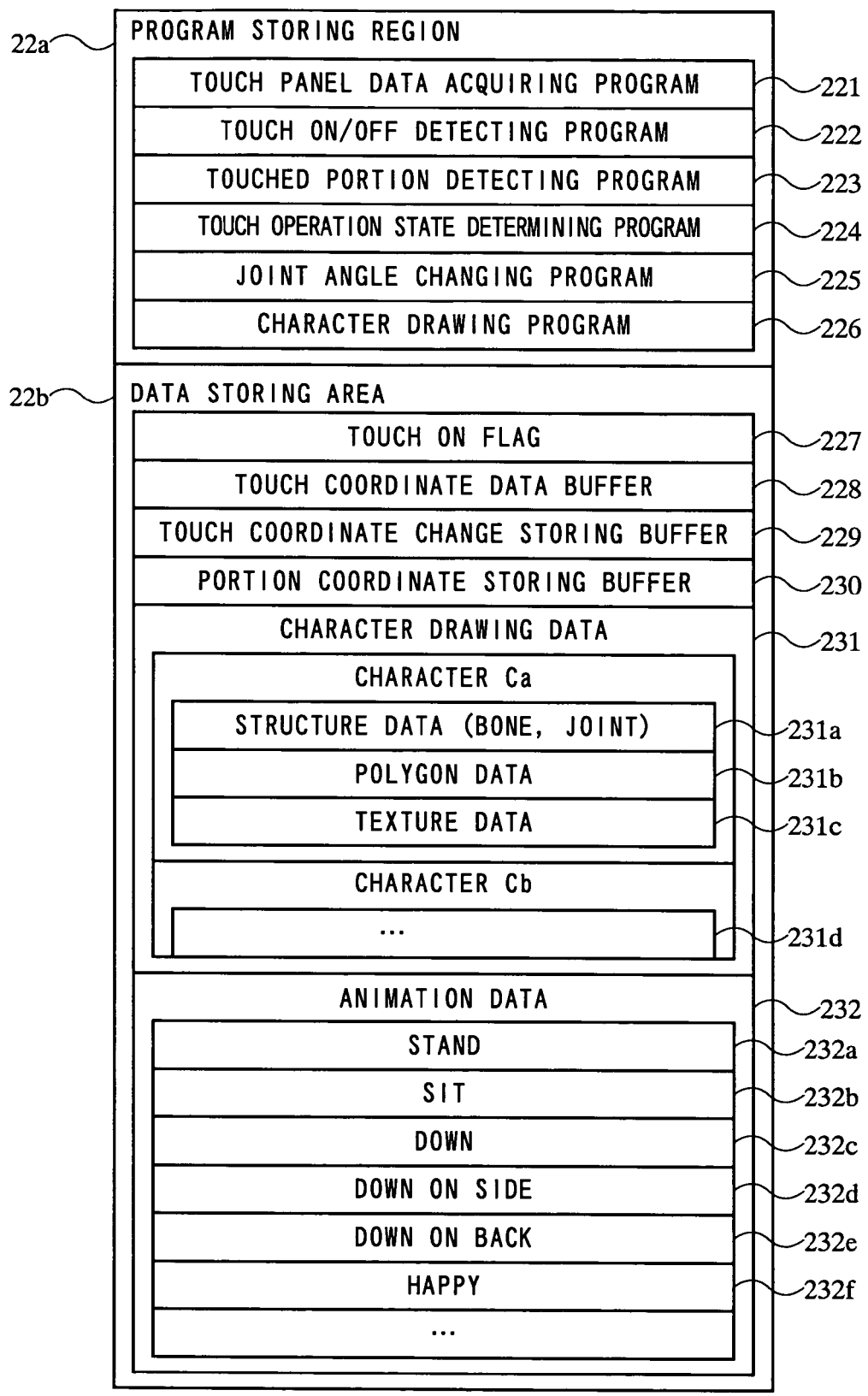
FIG. 11 is a diagram illustrating an image which is read out from a cartridge 17 of FIG. 1 and is stored into a WRAM 22 as appropriate.

FIG. 11 is a diagram illustrating an image of WRAM 22 whose data are read out from the cartridge 17 and stored appropriately. As illustrated in FIG. 11, the WRAM 22 has a program storing area 22a for storing a group of instructions which can be executed by the computer (particularly, the CPU core 21) of the game apparatus 1 and a data storing area 22b for storing a group of data. Although, in this example, the game program and the data are stored in the cartridge 17, the game program and the data can be supplied by other media or a communication line.

The game program which is to be stored appropriately into the program storing area 22a may be divided into programs having separate functions which are to be executed the game apparatus 1. Examples of such sub-programs include a touch panel data acquiring program 221, a touch ON/OFF detecting program 222, a touched portion detecting program 223, a touch operation state determining program 224, a joint angle changing program 225, a character drawing program 226, and the like.

The touch panel data acquiring program 221 is a program which acquires the touch panel coordinates (touch coordinates) of a position touched by the player on the touch panel 13 by reading out data from a touch coordinate data buffer 228 described below. The touch ON/OFF detecting program 222 is a program which detects whether or not the player touches the touch panel 13. The touched portion detecting program 223 is a program which calculates game space coordinates corresponding to touch coordinates acquired by execution of the touch panel data acquiring program 221 to detect a touched portion indicated by the game space coordinates. The touch operation state determining program 224 is a program which analyzes touch coordinates acquired by execution of the touch panel data acquiring program 221 to determine whether or not an operation performed by the player on the touch panel 13 is the above-described drag operation.

The joint angle changing program 225 is a program which changes a joint angle of a character, depending on an area of polygon data indicated by a touched portion detected by execution of the touched portion detecting program 223. The character drawing program 226 is a program which displays an image of a character set in a game space on the second LCD 12, depending on the structure data (bones B, joints J), the polygon data, and the texture data.

Examples of the data group stored as appropriate in the data storing area 22b include a touch ON flag 227, a touch coordinate data buffer 228, a touch coordinate change storing buffer 229, a portion coordinate storing buffer 230, character drawing data 231, animation data 232, and the like.

The touch ON flag 227 is a flag which is turned ON when it is determined by execution of the touch ON/OFF detecting program 222 that the player touches the touch panel 13. The touch coordinate data buffer 228 is a storage area which temporarily stores input information input through the touch panel 13 (touch panel coordinate position(s); touch coordinates). The touch coordinate change storing buffer 229 is a storage area which temporarily stores a change in touch coordinates for each unit time. The portion coordinate storing buffer 230 is a storage area which temporarily stores the game space coordinates of a touched portion detected by execution of the touched portion detecting program 223.

The character drawing data 231 is data for displaying a plurality of characters Ca, Cb, . . . , and Cn on a game screen. For example, the character drawing data 231 for displaying the character Ca on the game screen includes structure data 231a, polygon data 231b, and texture data 231c. Note that the structure data 231a includes a plurality of the above-described bones B and joints J.

The animation data 232 is data for setting the posture or facial expression of the character C which are to be displayed on the game screen. For example, when the character C is a dog, data about "stand" 232a, "sit" 232b, "down" 232c, "down on side" 232d, "down on back" 232e, "happy" 232f, and the like are set as the animation data 232. By selecting one of these values of the animation data 232 as appropriate, the joint angles and the like of the structure data of the character drawing data 231 are changed, and the character C is drawn, taking a posture corresponding to the animation data 232.

Figure 12:
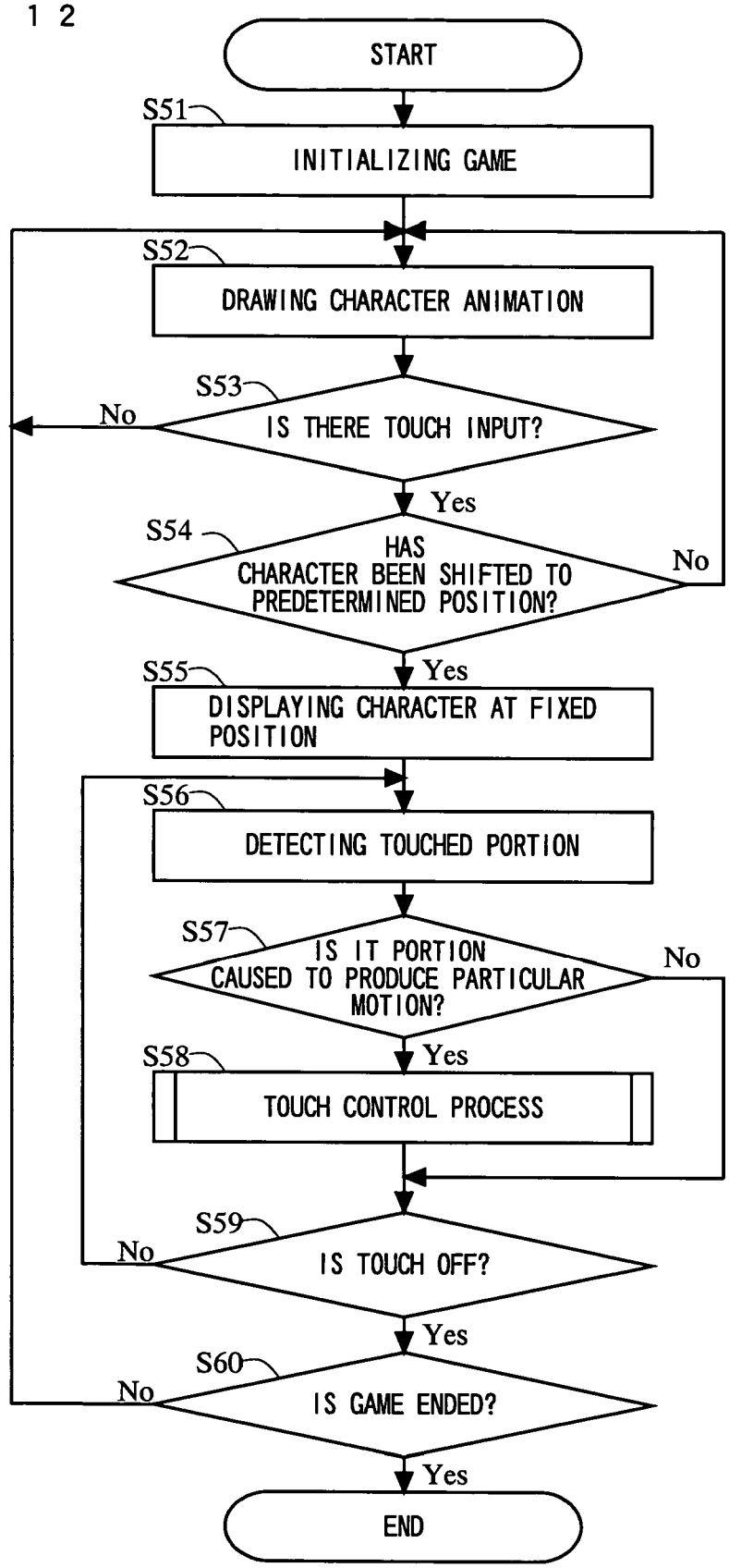
FIG. 12 is a flowchart illustrating a game process performed by the game apparatus 1 of FIG. 1.
Figure 13:
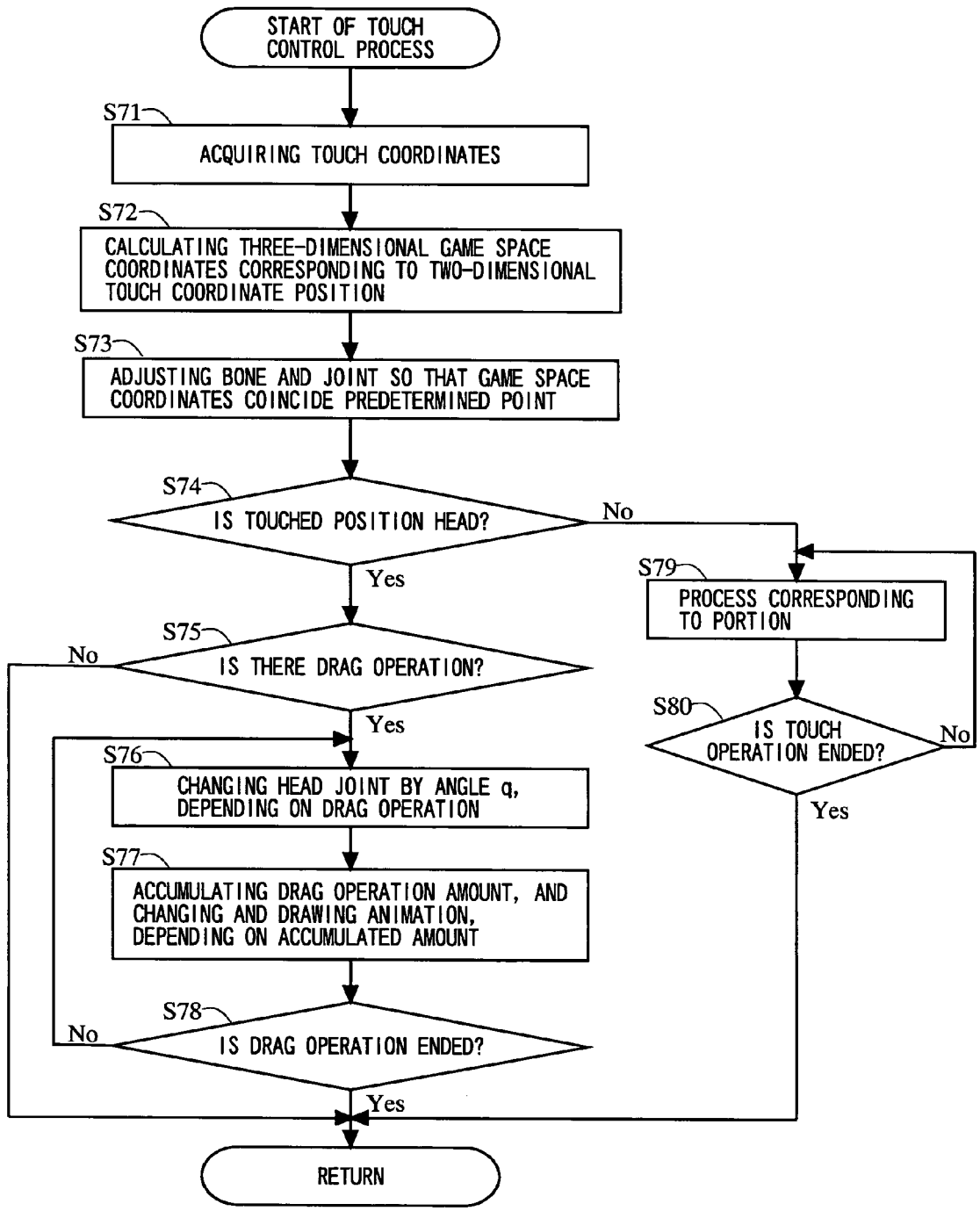
FIG. 13 is a flowchart illustrating a subroutine indicating details of a touch control process in step 57 of FIG. 12.

Next, a flow of a game process performed by the game apparatus 1 will be described with reference to FIGS. 12 and 13. FIG. 12 is a flowchart illustrating the flow of the game process performed by the game apparatus 1. FIG. 13 illustrates a detailed flow of a touch control process (a subroutine) in step 57 in FIG. 12.

When the power source (not shown) of game apparatus 1 is turned ON, the CPU core 21 executes a boot program (not shown), thereby loading a game program stored in the cartridge 17 to the WRAM 22. When the loaded game program is executed by the CPU core 21, steps (abbreviated as "S" in FIGS. 12 and 13) indicated in FIG. 12 are executed. By executing the game program, a game image or the like corresponding to the game program is displayed on the second LCD 12.

Referring to FIG. 12, the CPU core 21 performs initialization of the game processing (step 51), and causes the process to go to the next step. Specifically, the CPU core 21 sets the touch ON flag to be OFF, initializes the animation data 232 for each character to be placed in a game space, and places the character at an initial position.

Next, the CPU core 21 draws each character placed in the game space based on animation data and a display position thereof (step 52), and causes the process to go to the next step. Thereby, the game space in which the character C is placed is displayed on the second LCD 12.

Next, the CPU core 21 determines whether or not the player performs a touch operation on the touch panel 13 (step 53). When the player performs a touch operation on the touch panel 13, the CPU core 21 turns ON the touch ON flag 227 and causes the process to go to the next step 54. On the other hand, when the player does not perform a touch operation on the touch panel 13, the CPU core 21 turns OFF the touch ON flag 227 and returns to the above-described step 52 and repeats the process.

In step 54, the CPU core 21 calculates game space coordinates corresponding to touch coordinates which are obtained by the player performing a touch operation on the touch panel 13, and determines whether or not the character C has been shifted to a position of the game space coordinates. For example, the CPU core 21 sets a virtual projection plane onto which the touch coordinates are projected, in the game space, and causes the character C to move toward a position indicated by the touch coordinates on the virtual projection plane. When the character C has been shifted to the position specified by the touch operation, the CPU core 21 causes the process to go to the next step 55. On the other hand, when the character C has not yet been shifted to the position specified by the touch operation, the CPU core 21 returns to the above-described step 52 and repeats the process.

In step 55, the CPU core 21 fixes a viewpoint position of a virtual camera, and displays the character C, which has been shifted to the position specified by the touch operation, at a fixed position in the game space. Thereby, the CPU core 21 can more easily associate the two-dimensional touch coordinates on the touch panel 13 with the three-dimensional game space coordinates. Thereafter, the CPU core 21 causes the process to go to the next step.

Next, the CPU core 21 detects a touched portion of the character C indicated by the game space coordinates corresponding to the touch coordinates (step 56). Thereafter, the CPU core 21 determines whether or not the detected touched portion is a portion of the character C which is caused to perform a particular motion (step 57). When the touched portion is a portion which is caused to perform a particular motion, the CPU core 21 performs a touch control process (step 58), and causes the process to go to the next step 59. Note that details of step 58 will be described below. On the other hand, when the touched portion is not a portion which is caused to perform a particular motion, the CPU core 21 causes the process to go directly to the next step 59.

In step 59, the CPU core 21 determines whether or not the touch ON flag 227 is OFF. When the touch ON flag 227 is not OFF (i.e., is ON), the CPU core 21 returns to the above-described step 56 and repeats the process. On the other hand, when the touch ON flag 227 is OFF, the CPU core 21 determines whether or not the game is ended (step 60). When the game is continued, the CPU core 21 returns to the above-described step 52 and repeats the process. When the game is ended, the process of the flowchart is ended.

Next, a flow of the touch control process in the step 57 will be described in detail with reference to FIG. 13. The CPU core 21 acquires the touch coordinates of a position touched by the player on the touch panel 13 (step 71), and calculates three-dimensional game space coordinates corresponding to the two-dimensional touch coordinate position (step 72). For example, the CPU core 21 projects the touch coordinates onto the virtual projection plane set in the game space, and calculates a projected position on the virtual projection plane as the game space coordinates corresponding to the touch coordinate position. Thereafter, the CPU core 21 adjusts the bones B and joints J of the character C (step 73) so that a predetermined point(s) of the character C coincides the game space coordinates calculated in the above-described step 72 (see FIG. 7), and causes the process to go to the next step. Note that the predetermined points of the character C are provided within a plurality of portions (e.g., a front part of a head, or a hand) at which the character C is caused to perform a particular motion.

Next, the CPU core 21 determines whether or not a touched portion corresponding to the touch coordinates is a head of the character C (step 74). Thereafter, when the touched portion is the head, the CPU core 21 causes the process to go to the next step 75. On the other hand, when the touched portion is not the head, the CPU core 21 causes the process to go to the next step 79.

In step 75, the CPU core 21 determines whether or not the player performs a drag operation on the touch panel 13 (see FIG. 6). When the player does not perform a drag operation, the CPU core 21 immediately ends the subroutine. On the other hand, when the player performs a drag operation, the CPU core 21 changes the joint J set in the head of the character C by an angle of $\theta$ (see FIG. 9), depending on the drag operation (step 76). Specifically, when the game space coordinates corresponding to the touch coordinates input by the drag operation falls within the left rotation area ZL, the joint J of the head of the character C is rotated by the angle of $\theta$ in the left rotational direction about the X axis (bone B) when viewed from the front (see FIG. 10B). When the game space coordinates corresponding to the touch coordinates input by the drag operation falls within the right rotation area ZR, the joint J of the head of the character C is rotated by the angle of $\theta$ in the right rotational direction about the X axis when viewed from the front (see FIG. 10C). The CPU core 21 accumulates the amounts of continuous drag operations, changes the animation data 232 of the character C, depending on the accumulated amount, draws the character C (step 77), and causes the process to go to the next step. For example, the CPU core 21 changes the animation data 232 in a manner, such as "stand" 232a→"sit" 232b→"down" 232c→"down on side" 232d→"down on back" 232e, as the accumulated amount of the drag operation is increased. By changing the angles of the joints J of the character C, depending on the change, the character C is drawn so that the posture thereof is changed.

Next, the CPU core 21 determines whether or not the player has ended the drag operation on the touch panel 13 (step 78). When the drag operation is continued, the CPU core 21 returns to the above-described step 76 and repeats the process. On the other hand, when the drag operation has been ended, the CPU core 21 ends the process of the subroutine.

On the other hand, in the above-described step 74, when the touched portion is not a head, the CPU core 21 performs a process corresponding to the portion (step 79) until the touch operation is ended (step 80). When the player ends the touch operation on the touch panel 13 (Yes in step 80), the touch ON flag 227 is turned OFF and the process of the subroutine is ended.

Although, in the foregoing description, the touch operation is illustrated as a reciprocating motion of a single joint which is changed through a touch operation by an angle fixed to the joint. Alternatively, the joint angle controlled with respect to the touch operation may not be a fixed value. For example, the joint angle may be changed to follow touch coordinates specified by the player through a touch operation. Alternatively, the angles of a plurality of joints may be changed, depending on a touch operation.

Thus, by changing the angle of the joint J, depending on a touch operation on the touch panel 13, in real time, the three-dimensional motion of the character C can be controlled. In addition, since the three-dimensional character C is defined with bones and joints which are simple in terms of processing, the motion of the character C can be easily controlled.

Although the touch panel 13 is integrated with the game apparatus 1 in the above-described example, the game apparatus and the touch panel may be separated from each other in the present invention. Although two display devices are provided in the above-described example, only one display may be provided. Specifically, in the above-described example, the first LCD 11 may not be provided, and only the second LCD 12 covered with the touch panel 13 may be provided. Alternatively, in the above-described example, the second LCD 12 may not be provided, and the touch panel 13 may be provided on a top surface of the first LCD 11.

Although the touch panel 13 is integrated with the game apparatus 1 in the above-described example, a game program may be executed on a data processing device, such as a general personal computer having a touch panel as one of the input devices.

The game apparatus and the storage medium storing the game program of the example embodiment presented herein can cause a three-dimensional character to produce a motion by changing the angle of a joint in accordance with a touch operation on a touch panel in real time, and therefore, are useful as a game apparatus having a touch panel or the like as input means or a game program executed in the game apparatus.

While the example embodiment has been described in detail, the foregoing description is in all aspects illustrative and not restrictive. It is understood that numerous other modifications and variations can be devised without departing from the scope of the example embodiment.

What is claimed is:

1. A game apparatus for a game which causes a character appearing in a game space to produce a motion, depending on an operation of a player, comprising:

a display for displaying an image of the character on a display screen;

a touch panel covering the display screen of the display;

touch operation input data storing memory for temporarily storing touch operation input data input through a touch operation on the touch panel, including an initial touch point on the touch panel;

structure data storing memory for storing structure data of the character, wherein the character has a plurality of bones and one or more joints, and the plurality of bones are joined together with the joints;

polygon data storing memory for storing polygon data for each portion of the character defined corresponding to each of the plurality of bones;

character position control programmed logic circuitry for controlling a position of the character in the game space;

character display control programmed logic circuitry for drawing and displaying the character on the display screen based on the structure data, the polygon data, and the position of the character;

touched portion detecting programmed logic circuitry for calculating position data of a portion of the character in the game space relative to the initial touch point to detect the position of the portion of the character relative to the initial touch point; and joint angle changing programmed logic circuitry for controllably changing an angle of a joint of the character corresponding to the portion by rotating said joint in response to the portion of the character coinciding with the initial touch point and directional information input by the player on the touch panel, wherein the joint of the character rotates in a first rotational direction in response to the directional information input by the player being provided in a first direction, and the joint of the character rotates in a second rotational direction, which is opposite to the first rotational direction, in response to the directional information input by the player being provided in a second direction which is opposite to the first direction, wherein the character display control programmed logic circuitry moves a portion whose joint angle is changed by the joint angle changing programmed logic circuitry, in real time, depending on the angle, and draws and displays the character on the display screen.

2. The game apparatus according to claim 1, further comprising:

touch operation state determining programmed logic circuitry for determining a touch operation state with respect to the touch panel based on the touch operation input data, wherein, when the touch operation state determining programmed logic circuitry determines that the touch operation is a drag operation in which a position of the touch operation is continuously changed, the joint angle changing programmed logic circuitry changes the joint angle of the character, depending on a direction of the drag operation.

3. The game apparatus according to claim 2, further comprising:

animation data storing memory for previously storing a plurality of patterns of motions of positions of the bones and the joints of the character;

accumulated amount calculating programmed logic circuitry for, when the touch operation state determining programmed logic circuitry determines that the touch operation is a drag operation in which a position of the touch operation is continuously changed, accumulating an operation distance of the drag operation; and animation selecting programmed logic circuitry for selecting a pattern stored in the animation data storing memory, depending on the operation distance accumulated by the accumulated amount calculating programmed logic circuitry, wherein the character display control programmed logic circuitry draws and displays the character on the display screen, depending on the pattern selected by the animation selecting programmed logic circuitry.

4. The game apparatus according to claim 1, further comprising:

area setting programmed logic circuitry for setting an area in which a joint angle changed by the joint angle changing programmed logic circuitry is specified, to be at least a portion of a portion of the character, wherein, when the position data corresponding to the touch operation input data indicates an inside of the area set by the area setting programmed logic circuitry, the joint angle changing programmed logic circuitry changes the joint angle of the character in accordance with the angle specified in the area.

5. The game apparatus according to claim 4, wherein the area setting programmed logic circuitry divides a portion of the character into two areas, and the areas specify the same angle and opposite rotational directions, in accordance with which the joint angle is changed.

6. The game apparatus according to claim 5, wherein the area setting programmed logic circuitry sets a direction, along which the two areas are divided, to be consistently fixed in a world coordinate system of the game space.

7. A storage medium storing a game program which is executed by a computer of a game apparatus for a game which causes a character appearing in a game space to produce a motion, depending on an operation of a player, wherein the game apparatus comprises a display of displaying the game space on a display screen, a touch panel covering the display screen of the display, and a storing memory, and the game program causes the computer to execute:

touch operation input data storing for temporarily storing touch operation input data input through a touch operation on the touch panel, including an initial touch point on the touch panel;

character position control for controlling a position of the character in the game space;

character display control for drawing and displaying the character on the display screen based on structure data of the character having a plurality of bones and one or more joints, wherein the plurality of bones are joined together with the joints, polygon data for each portion of the character defined corresponding to each of the plurality of bones, and the position of the character;

touched portion detecting for calculating position data of a portion of the character in the game space relative to the initial touch point to detect the position of the portion of the character relative to the initial touch point; and joint angle changing for, controllably changing an angle of a joint of the character corresponding to the portion by rotating said joint in response to the portion of the character coinciding with the initial touch point and directional information input by the player on the touch panel, wherein the joint of the character rotates in a first rotational direction in response to the directional information input by the player being provided in a first direction, and the joint of the character rotates in a second rotational direction, which is opposite to the first rotational direction, in response to the directional information input by the player being provided in a second direction which is opposite to the first direction, wherein the character display control moves the portion whose joint angle is changed by the joint angle changing, in real time, depending on the angle, and draws and displays the character on the display screen.

8. The storage medium according to claim 7, wherein the game program further causes the computer to execute:

touch operation state determining for determining a touch operation state with respect to the touch panel based on the touch operation input data, wherein, when the touch operation state determining determines that the touch operation state is a drag operation in which a position of the touch operation is continuously changed, the joint angle changing changes the joint angle of the character, depending on a direction of the drag operation.

9. The storage medium according to claim 8, wherein the game program further causes the computer to execute:

accumulated amount calculating for, when the touch operation state determining determines that the touch operation state is a drag operation in which a position of the touch operation is continuously changed, accumulating an operation distance of the drag operation; and animation selecting for selecting one of a plurality of patterns indicating motions of positions of the bones and the joints of the character, depending on the operation distance accumulated by the accumulated amount calculating, wherein the character display control draws and displays the character on the display screen, depending on the pattern selected by the animation selecting.

10. The storage medium according to claim 7, wherein the game program further causes the computer to execute:

area setting for setting an area in which a joint angle changed by the joint angle changing is specified, to be at least a portion of a portion of the character, wherein, when the position data corresponding to the touch operation input data indicates an inside of the area set by the area setting , the joint angle changing changes the joint angle of the character in accordance with the angle specified in the area.

11. The storage medium according to claim 10, wherein the area setting divides a portion of the character into two areas, and the areas specify the same angle and opposite rotational directions, in accordance with which the joint angle is changed.

12. The storage medium according to claim 11, wherein the area setting sets a direction, along which the two areas are divided, to be consistently fixed in a world coordinate system of the game space.

13. The game apparatus according to claim 1, wherein the directional information input by the player comprises a drag operation in which a position of the touch operation is continuously changed.

14. The storage medium according to claim 7, wherein the directional information input by the player comprises a drag operation in which a position of the touch operation is continuously changed.

* * * * *